Aug. 2, 1938.  J. N. ICE  2,125,570
PIPE COUPLING
Filed April 12, 1937

Inventor.
James N. Ice

Patented Aug. 2, 1938

2,125,570

UNITED STATES PATENT OFFICE 2,125,570

PIPE COUPLING

James N. Ice, Wheeling, W. Va., assignor to Dise Engineering & Manufacturing Company, Wheeling, W. Va.

Application April 12, 1937, Serial No. 136,445

1 Claim. (Cl. 285—145)

This invention relates to an improvement in pipe couplings wherein one or both of the members secured to the pipe ends are particularly and peculiarly formed to provide protection for the end of the pipe against breakage and also wherein the pipe engaging member is designed to form or cut its own thread in the pipe during the application of the member.

The primary object of the invention is the provision of a coupling made up of members to be connected to the ends of the pipes to be coupled, with one or both of said members constituting an elongated sleeve interiorly formed with thread cutting elements and exteriorly formed with a threaded length to provide for cooperation with the coupling sleeve or nut, the pipe engaging member being designed to be applied to the pipe and merely turned in relation thereto by a Stillson wrench or other operating member with the effect to cause said pipe engaging member to form on the pipe a series of threads by which the member is held to the pipe.

A further object of the invention is the provision of a coupling in which the pipe engaging member or members are interiorly formed with thread cutting areas separated by channels to provide for convenient escape of the cuttings, with the thread forming areas having transverse cutters which, in the relative rotation of the member with respect to the pipe, will form threads with which the cutters cooperate to maintain an exact clean-cut and positive threaded connection between the pipe engaging member of the coupling and the pipe.

A further object of the invention is the provision of a pipe coupling wherein the pipe engaging element or elements are formed with thread cutting areas and wherein the cutting elements of such areas are directly reversed with respect to the conventional type of thread cutting elements; that is to say, wherein the leading end of such cutting elements is higher or of maximum cutting depth, with the cutting elements gradually of reduced height toward the trailing end. As a result of this particular formation of the cutting elements, the coupling member or members may be applied and caused to bite into the pipe with the minimum of exertion, that is, for example, by hand because the initial turning movement of the member causes the leading end to immediately and directly bite into the metal of the pipe. Thus, the labor and pressure required in the application and use of a conventional thread cutter, wherein the cutting elements increase in cutting depth from the leading end to the trailing end is entirely avoided, and the improved coupling elements may be applied and partially started by hand and thereafter completely operated for the desired threading depth by the mere use of a Stillson wrench or other applicator.

A further object of the invention is the provision of coupling members formed with thread cutting elements on their interior, with such elements extended axially materially beyond the thread cutting area in order to provide a substantial strengthening reinforce for the pipe to which the element is applied.

The invention is illustrated in the accompanying drawing, in which.

Figure 5:
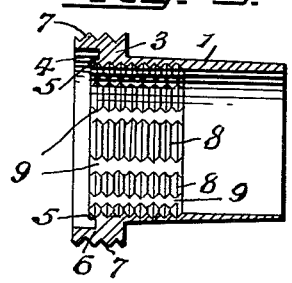
Figure 5 is a broken plan detail view of one of the coupling members constructed in accordance with the present invention.

The improved coupling unit with which the present invention is more particularly concerned is best illustrated in detail in Figure 5. This unit includes an elongated sleeve 1, the interior diameter of which corresponds to the exterior diameter of the pipe section, as 2, to the terminal of which the coupling unit is to be applied. This elongated sleeve-like section is materially thickened at 3 at its leading end, the thickening being exteriorly of the sleeve and the sleeve wall beyond the thickened area being preferably, though not necessarily, of gradually decreased thickness.

The face of the thickened end 3 of the unit is formed with an annular channel 4 so disposed as to leave a thin wall 5 defining the inner margin of the channel and a thicker wall 6 defining the outer wall of the channel. The outer surface of the thickened portion 3 is threaded, as at 7, for the reception of the coupling nut or sleeve, as will later appear.

The coupling unit is formed interiorly with a thread cutting formation at 8, this thread cutting formation being arranged in a series of longitudinally extending sections separated by plain channels 9 to provide for the convenient escape of the cuttings, as is conventional in thread cutters. The thread cutting sections 8 extend from the extreme free edge of the thin wall 5 of the channel 4 to a point materially short of the opposite or trailing end of the unit, so that a material portion of the length of the sleeve 1 of the unit is plain and designed to snugly embrace the pipe terminal 2.

The threading area, or more particularly each threading section, is formed with a cutter ridge or land 10 by which the material of the pipe is cut to form the threads. Heretofore, in conventional thread cutters, the cutting lands are of relatively different cutting depths, considered longitudinally of such lands, and the leading end of such cutting lands has ordinarily been formed as of the least cutting depth and from this leading end the cutting depth of the particular lands has been gradually increased to the trailing end.

Figure 4:
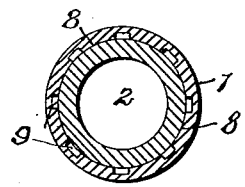
Figure 4 is a section on the line 4—4 of Figure 2.

The formation of these lands in the particular invention described is, however, directly reversed from that of the conventional type of thread cutter; that is to say, the leading end of the lands in the direction of cutting movement of the unit is of minimum cutting depth, as indicated at 11 in Figure 4, and from this leading end of minimum cutting depth, each cutting land is of gradually decreased cutting depth toward the trailing end.

This particular formation of the threading section of the unit is of importance because, as the unit is slipped over the pipe 2 until the initial or rearmost cutting lands engage the end of the pipe, it is apparent that by a mere turning movement of the unit, which may be readily accomplished by the force exerted by hand, the leading minimum depth ends of the cutting lands will immediately bite slightly into the material of the pipe and thus, in effect, the threading formation is started. This threading formation may be continued with the application of a Stillson wrench or other instrument to the exterior of the unit. In this way, the coupling element or unit being described may be readily and easily applied to the pipe end, thus adapting the unit for application to the coupling of pipe sections which might be difficult to reach and hold and thread through the conventional thread cutter.

It is recognized that in the use of the conventional thread cutter very material pressure is required to start the cutting operation for the reason that the cutting lands having in such conventional type of thread cutter the maximum cutting depth at the leading end, a turning tendency of the cutter is to throw the latter away from the pipe, that is toward the end of the pipe being threaded, thus pressure in a very appreciable amount is required to start the conventional thread cutter. With the cutting lands formed as described, however, the coupling unit of the present invention may be readily and conveniently started by hand on account of the initial bite or grip of the leading minimum depth cutting end of the lands by which the threaded coupling is held to the pipe and thus readily turned by an appropriate wrench for the thread cutting operation.

Figure 1:
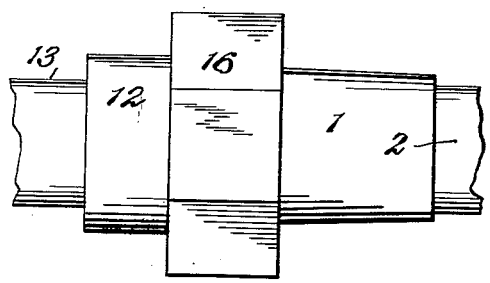
Figure 1 is a view in elevation of the improved coupling member as applied to pipe ends.
Figure 2:
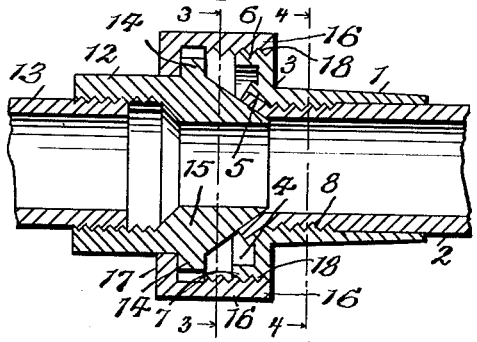
Figure 2 is a longitudinal section of the same.
Figure 3:
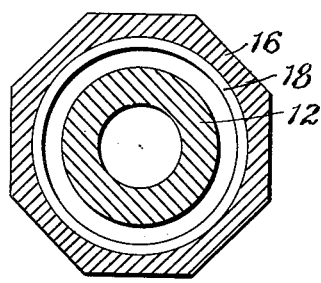
Figure 3 is a section on the line 3—3 of Figure 2.

It is to be particularly noted, as seen in Figure 2, that the coupling unit is to be applied to the pipe so that the free end of the pipe is substantially flush with the free end of the relatively thin wall 5 of the unit.

In Figure 2 I have shown cooperating element 12 of the coupling as conventional and threaded upon the pipe end 13, this element 12 being formed with an annular rib 14 and a conical projection 15 designed to fit within the free end of the pipe section 2 during completion of the coupling. A coupling nut 16 of conventional form is provided with a terminal inwardly extending flange 17 designed to engage behind the rib 14 of the element 12, with such nut interiorly threaded at 18 to cooperate with the threaded area 7 of the unit forming the subject-matter of this application.

The assemblage of the coupling is obvious from the illustration in Figure 2, it being noted, however, that as the conical terminal 15 of the element 12 enters the free end of the pipe 2 during the coupling connection of the nut 16, there is a tendency to spread the free end of the pipe 2 which, as illustrated in Figure 2, is somewhat exaggerated for the purpose of clearness. This spreading tendency, which by reason of the thin wall 5 is not materially restricted, forms an enlargement in the free end of the pipe section 2 which further assists in preventing endwise movement of the coupling unit.

Thus, the unit is anchored to its pipe section and held against endwise displacement toward the free end of the pipe section 2 not only by its threaded connection with the pipe section but by the spreading of such pipe section as described.

While, for convenience, the element 12 is shown as of conventional form, it is of course to be understood that such element 12 may, if desired, be a duplicate of the unit previously described except in the particular that the free end of the unit is provided with the conical projection 15 and with the annular rib 14.

Figure 6:
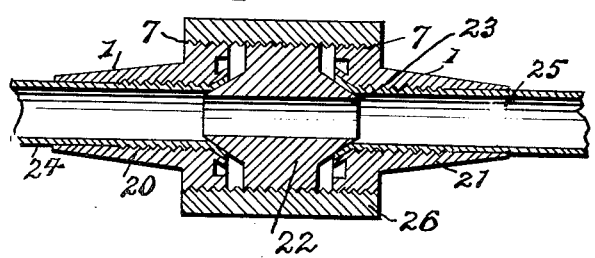
Figure 6 is a broken longitudinal sectional view showing a slightly modified form of coupling unit.
Figure 7:
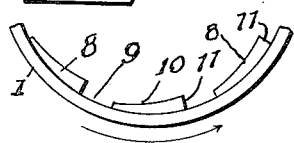
Figure 7 is a broken detail showing more particularly the form of the cutting lands.

In Figure 6, there is illustrated a slightly modified construction in which the connecting element is in the form of a sleeve rather than in the form of a nut, as in the preferred form. This modified form shows the coupling units, indicated respectively at 20 and 21, as identical with the unit 1 described in the preferred form and the various details of each of said units are indicated by the same reference numerals as previously employed.

A bridging member 22 with conical ends 23 to fit within the adjacent pipe sections indicated at 24 and 25 is applied between the coupling units and a connecting sleeve 26 is designed to engage the threaded areas 7 of the respective coupling units. Of course, the sleeve and coupling units are appropriately threaded throughout the areas designed to compel rotative movement of the connecting sleeve 26 to draw the units toward each other for the coupling operation. Sealing gaskets are applied as in the preferred form to complete a sealing of the coupling.

The essential feature of the improved coupling unit is its provision of cutting its own threads as it is applied in position. This will permit the use of a coupling of this type in those situations where the initial threading of the pipe and the subsequent application of a coupling unit is a difficult if not impossible operation. With the present unit, it may be applied to the end of the pipe which is to be coupled to an adjacent pipe end by merely positioning the unit by hand on the end of the pipe and turning up to a complete setting by a Stillson wrench or other applicator which may be used in practically any and all pipe situations.

Where a pipe already in place is broken or fractured by temperature conditions and it is necessary to insert an additional pipe section and make a coupling, it is an extremely difficult operation to thread the pipe ends with the conventional threader and apply a conventional coupling.

With the improved coupling unit, the application is extremely simple as the coupling feeds its own way from the very start onto the pipe and this by a mere rotative action incident to the use of an ordinary Stillson wrench or the like. Thus, where the broken end of the pipe is accessible at all, the improved coupling unit may be readily and conveniently applied with the certainty of providing a proper union connection.

Furthermore, it is to be noted that the sleeve 1 of the unit extends for a material distance beyond the threading area. This materially reinforces the pipe for a considerable portion of its length from the free end and thus adds material strength to the pipe where such strength is most needed.

It is, of course, to be understood that the material of the units is of such nature as to provide for convenient thread cutting of the ordinary iron pipes, such units being constructed, for example, of steel. Incident to the added strength communicated by the coupling unit to the pipe end, the use of material of a character and strength to cut an iron pipe will naturally strengthen the free end of the pipe to a degree materially beyond that of the remaining length of the pipe. Thus, breakage or fracture of the pipe end within the area of the coupling is prevented to a marked degree, so that the coupling end of the pipe, contrary to the usual practice, becomes the point of greatest strength in the pipe length.

Furthermore, there is another material advantage in the use of a coupling unit which will thread its own way onto the pipe. In ordinary couplings, where the threads are first formed on the pipe by a thread cutter and the coupling unit within which the threads have been previously formed by another thread cutter, of course in the shape of a die, there is a possibility in actual practice of a slight mutilation or distortion of the threads in one or both of such threaded areas. This at once leads to difficulties in applying the coupling and reduced strength in the threaded connection.

In the present instance, the threads on the pipe end are formed by the coupling unit itself and, when so formed, remain as the threaded connection. As the elements which, in effect, form the threads on the coupling unit are the cutters which form the threads on the pipe, it is at once apparent that there is perfect cooperation between such threads when the junction is completed; hence the threads necessarily present the maximum of strength for a threaded connection and there is not any liability of any distortion of the previously formed threads in either section, as conventionally practiced, creating a corresponding distortion and therefore a weakening as the elements are connected.

What is claimed to be new is:

A pipe coupling unit including a member to fit over one pipe end, and thread cutting elements on the interior of said member to cut threads on the member to which the pipe is being applied to insure threaded connection of the member with the pipe end, said thread cutting elements being provided as a series of longitudinally extending thread cutting sections separated by plain channels, said thread cutting elements having their trailing ends of maximum thread cutting depth and their leading ends of reduced depth, whereby the threading operation in applying the first mentioned member is perfected solely by turning the first mentioned member.

JAMES N. ICE.